(12) United States Patent
Sievers et al.

(10) Patent No.: US 7,893,666 B2
(45) Date of Patent: Feb. 22, 2011

(54) DEVICE AND METHOD FOR CHARGING AN ELECTRICAL ENERGY STORAGE DEVICE

(75) Inventors: Falko Sievers, Wannweil (DE); Hartmut Schumacher, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 641 days.

(21) Appl. No.: 11/792,025

(22) PCT Filed: Sep. 12, 2005

(86) PCT No.: PCT/EP2005/054520
§ 371 (c)(1),
(2), (4) Date: Mar. 19, 2008

(87) PCT Pub. No.: WO2006/058800
PCT Pub. Date: Jun. 8, 2006

(65) Prior Publication Data
US 2008/0246452 A1 Oct. 9, 2008

(30) Foreign Application Priority Data
Nov. 30, 2004 (DE) ........................ 10 2004 057 690

(51) Int. Cl.
*G05F 1/10* (2006.01)
(52) U.S. Cl. ...................................... 323/222
(58) Field of Classification Search .......... 323/222–225, 323/268, 271, 282, 284, 285, 288, 908
See application file for complete search history.

(56) References Cited

U.S. PATENT DOCUMENTS

| 5,420,780 | A | * | 5/1995 | Bernstein et al. ............... 363/89 |
| 5,666,042 | A | * | 9/1997 | Lewis ......................... 320/163 |
| 5,754,419 | A | | 5/1998 | Ho et al. |
| 5,998,977 | A | | 12/1999 | Hsu et al. |
| 6,094,036 | A | | 7/2000 | Rampold et al. |
| 7,352,162 | B1 | * | 4/2008 | Chang et al. ................. 323/290 |
| 2003/0062880 | A1 | | 4/2003 | Sudou |

FOREIGN PATENT DOCUMENTS

| EP | 1 231 697 | 8/2002 |
| FR | 2 838 572 | 10/2003 |
| JP | 10-105455 | 4/1998 |
| JP | 11-196568 | 7/1999 |
| JP | 2000-324807 | 11/2000 |

* cited by examiner

*Primary Examiner*—Matthew V Nguyen
(74) *Attorney, Agent, or Firm*—Kenyon & Kenyon LLP

(57) ABSTRACT

A device is described for charging an electrical energy storage device, which has an active current-limiting device in a main current path in order to limit a supply current to a predefined maximum current. A voltage transformer device is situated downstream from the current-limiting device for raising the potential of the electrical energy storage device over a supply potential.

21 Claims, 6 Drawing Sheets

Fig. 4

| $T_1$ | $I_V \leq I_M$ | $I_V > I_M$ |
|---|---|---|
| Preloading phase | Conducting and/or push-pull | non-conducting and/or push-pull |
| Step-Up Transforming phase | Conducting | Conducting |

| $T_3$ | $I_V \leq I_M$ | $I_V > I_M$ |
|---|---|---|
| Preloading phase | non-conducting and/or push-pull | conducting and/or push-pull |
| Step-up Transforming phase | non-conducting | non-conducting |

| $T_2$ | $I_V \leq I_{M2}$ | $I_V > I_{M2}$ |
|---|---|---|
| Preloading phase | non-conducting | non-conducting |
| Step-up transforming phase | Switched-mode | Switched-mode |

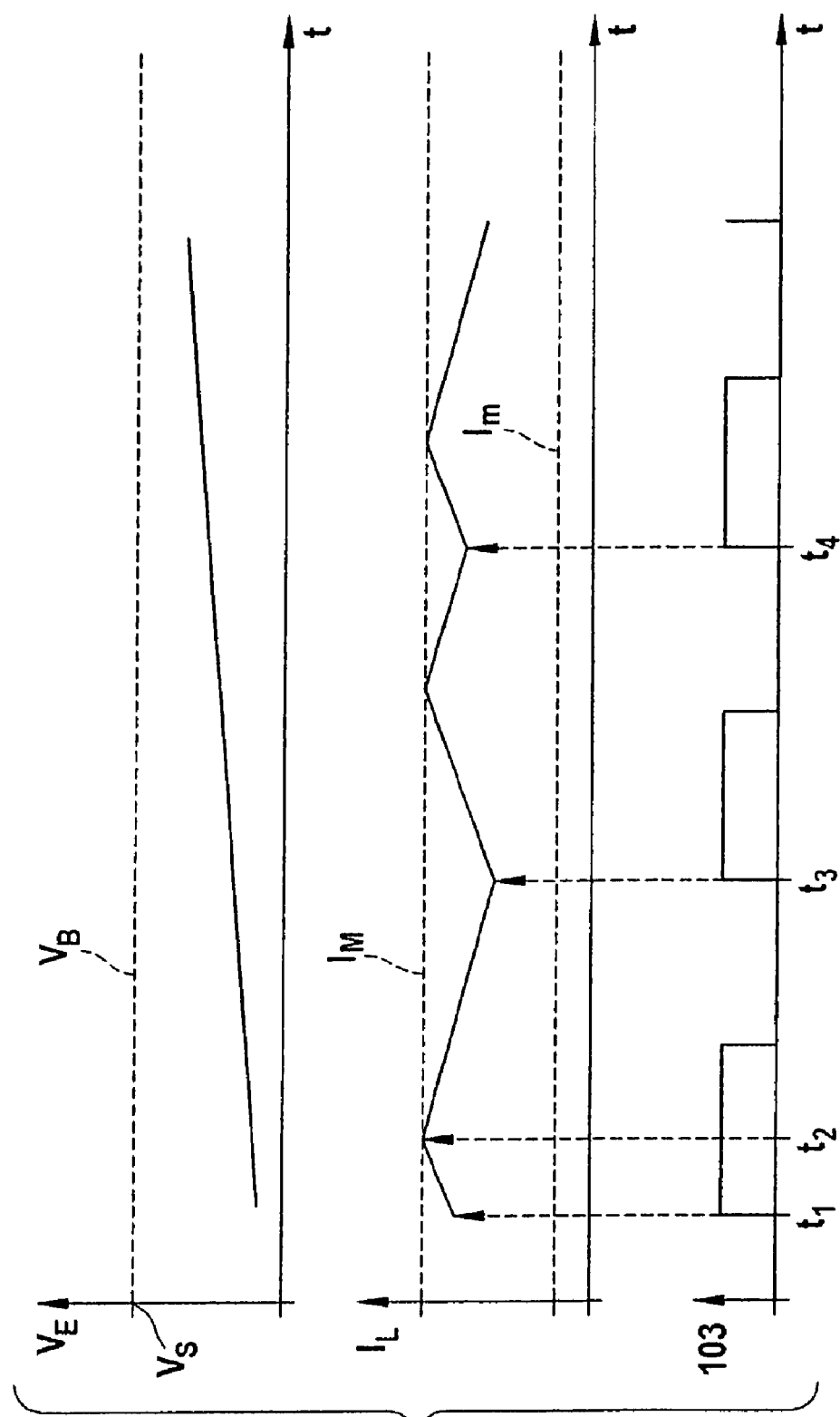

DEVICE AND METHOD FOR CHARGING AN ELECTRICAL ENERGY STORAGE DEVICE

FIELD OF THE INVENTION

The present invention relates to a device and a method for charging an electrical energy storage device.

Although the present invention is described with reference to charging an electrical energy storage device of an airbag system, the present invention is not limited thereto.

BACKGROUND INFORMATION

In vehicles, a primary electrical power supply source, which typically has a potential between 9 V and 18 V, is provided by a dynamo and a battery. Individual safety-relevant systems such as, for example, an airbag system, have their own electrical energy storage devices. It is thus ensured that, in the event of a failure of the primary power source, the safety-relevant systems are still able to perform their primary functions. To do so, a sufficient amount of energy must be storable in the energy storage devices. Since the capacity of the energy storage device cannot be arbitrarily increased for space and cost reasons, the energy storage devices are charged to an elevated potential, for example, 22 V to 45 V, to allow a higher amount of usable energy to be thus stored than would be possible at the typical supply potentials of 9 V to 18 V. In addition, voltages >10 V, for example, are needed for igniting airbag systems for reasons of usage restrictions.

When a vehicle or an airbag system is restarted, the energy storage device must be recharged. FIG. 6 schematically shows a device for charging the energy storage device. A main current path connects a power source E, which provides a supply current $I_v$, to energy storage device $C_E$. A voltage transformer device 20, which is able to raise storage potential $V_E$ of energy storage device $C_E$ to above supply potential $V_B$ of power source E, is situated in the main current path. An external diode D1 and an inductance L are situated in the main current path between power source E and voltage transformer device 20 to connect voltage transformer device 20. Since diode D1, inductance L, and voltage transformer device 20 do not have a high resistance, a high supply current $I_v$ would flow along the main current path when switching on even an empty energy storage device $C_E$. This may be disadvantageous for several reasons:

1. Considerable mass displacements occur, which may interfere with sensitive circuits.
2. The maximum current which a device may require is often limited by predefined specifications.
3. The thermal and thermal-mechanical loads reduce the useful life of the components due to the high currents.

Therefore, resistors R14 through R19 are situated in the main current path downstream from voltage transformer device 20. These resistors limit maximum supply current $I_v$ during switch-on, due to the increased resistance of the main current path. The efficiency of voltage transformer device 20 is disadvantageously reduced by resistors R14 through R19 because electrical power is dissipated in these resistors. This efficiency may be increased by a capacitor $C_4$ connected in parallel to resistors R14 through R19.

Due to the switched-mode operation of a transistor $T_2$ of voltage transformer device 20 and the associated interference signals in the range >150 kHz, the main current path must be filtered by a low-pass filter having a capacitor $C_2$ and resistors R13 through R10, which is situated between power source E and voltage transformer device 20 in the main current path.

The additional resistors R10 through R19 result not only in reduced efficiency of the device for charging energy storage device $C_E$ and in the associated problems of heat dissipation, but also in increased space requirement of the overall circuit and increased assembly costs due to the multiple individual elements.

SUMMARY

A circuit having high charging efficiency is needed.

In accordance with example embodiments of the present invention, an active current-limiting device in the main current path limits the supply current to a predefined maximum current. A switched voltage transformer device, which is situated downstream from the active current-limiting device in the main current path, raises the first electrical potential of the energy storage device above an electrical supply potential of an electrical power source. The supply current is provided by an energy storage device which is connected to the main current path.

The present invention may have the advantage over the related art in that the dynamic internal resistance of the current-limiting device drops with increasing charging state, i.e., the first potential of the energy storage device, while allowing a constant high current to flow. Thus, a significant power loss in the current-limiting device occurs only at the beginning of the charging process of the energy storage device. At the same time, the active current-limiting device prevents a higher current than the predefined maximum current from flowing during the initial charging of the energy storage device. The efficiency of the voltage transformer is very high because no resistors need to be connected downstream from it in the main current path. In addition, the number of discrete components for the device needed for charging is reduced to the active current-limiting device and the switched voltage transformer device, which may also be integrated together in a housing, as well as an additional inductance and an external diode.

According to a preferred refinement of the present invention, the current-limiting device has a controllable current source, which is situated in the main current path, the controllable current source being controlled by a control unit which detects the supply current and regulates the current flow of the supply current through the controllable current source to the predefined maximum current. The predefined maximum current may be determined on the basis of the electrical supply potential, the potential of the energy device and/or the difference between the above-mentioned potentials.

According to another particularly preferred refinement of the present invention, the current-limiting device has a first switching element, which is situated in the main current path and has a control unit which detects the supply current and generates a control signal which switches the first switching element to the non-conductive state when the supply current exceeds a predefined maximum current and switches the first switching element to the conducting state when the supply current is less than the predefined minimum current and/or switches to the conductive state after a predefined time period. In addition, the device has a freewheeling device which connects a tie point of the main current path between the current-limiting device and the voltage transformer device to a ground of the electrical power source. This device has the advantage that almost no power is dissipated in the current-limiting device because in the non-conducting state of the switching element no supply current flows, while in the conducting state the resistance of the switching element is negligibly low. This device therefore warms up advantageously only to a very small degree.

According to another refinement of the present invention, the freewheeling device has a diode which connects the main current path to the ground in the reverse direction. According to a preferred refinement, the freewheeling device has a third switching device, which is connected in phase opposition to the first switching element by the control unit. This reduces the power loss in the device by the amount that would be dissipated in the freewheeling diode in the above-mentioned refinement.

According to a further, particularly preferred, refinement of the present invention, the control unit detects the first potential of the energy storage device and/or the electrical supply potential. The control unit sets the predefined maximum current to a first maximum current when the first potential is below a first threshold value and to a second maximum current when the first potential is above the first threshold value. The first maximum current may be lower than the second maximum current. In addition, the second maximum current may be selected to be so high that the supply current is not limited by the current-limiting device. The advantage is in that the current-limiting device no longer limits the supply current in a high charging state of the energy storage device and thus no power is dissipated in the current-limiting device.

According to a preferred refinement of the present invention, the threshold value is equal to the supply potential of the power source or the threshold value is up to 3 V lower than the supply potential.

According to another refinement of the present invention, the current-limiting device has a storage area in which the threshold value, the first and second maximum currents, and/or the minimum current are stored. This makes it possible to adapt the device to given specifications so that the maximum currents are within allowed parameters.

According to another refinement of the present invention, the switched voltage transformer device is de-activated when the first potential of the energy storage device is lower than a second threshold value and is activated when the first potential exceeds the second threshold value. The first threshold value may be equal to the second threshold value. The voltage transformer device is thus advantageously de-activated as long as efficient charging is possible without the switched voltage transformer device.

According to one refinement of the present invention, the predefined time period is predefined by an oscillator.

According to one refinement of the present invention, the current-limiting device has an FET transistor which is situated in the main current path, the gate and source of the FET transistor being insulated from each other. In the non-conducting state, the gate is connected to ground, rather than to the source. The potential at the source is thus not determined by the switching signal. A control unit detects the supply current and generates a control signal which switches the first switching element into the non-conducting state when the supply current exceeds a certain maximum current and connects the switching element to ground when the supply current is lower than a predetermined minimum current and/or after a predefined time period. The inductance in the circuit and the non-existent feedback between gate and source of the FET transistor may cause the potential at the source to drop below the ground potential and thus keep the FET transistor dynamically conducting until the current in the inductive circuit drops to the ground potential. This advantageously allows a freewheeling device to be omitted which is needed to provide a freewheeling current for the inductance in the event of a blocked first switching device. In addition, a self-regulating switching-off operation results, which prevents the occurrence of induced voltage peaks.

BRIEF DESCRIPTION OF THE DRAWINGS

Exemplary embodiments of the present invention and advantageous refinements are shown in the figures and explained in greater detail below.

FIG. 4 shows, in a table, the switching state of switching elements of a specific example embodiment of the present invention.

FIG. 5 schematically shows the charging characteristic of a specific example embodiment of the present invention.

DESCRIPTION OF EXAMPLE EMBODIMENTS

Figure 1:
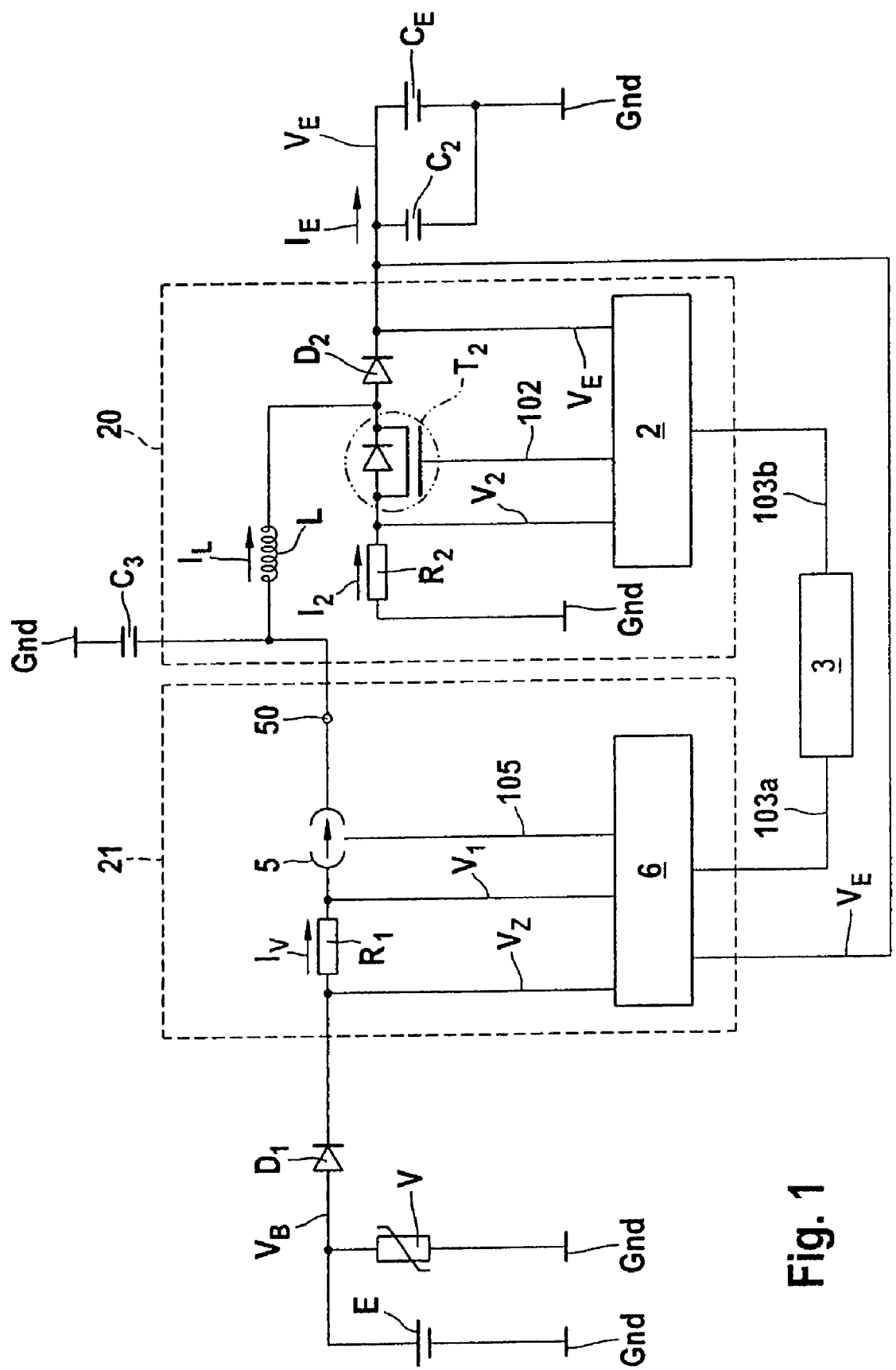
FIG. 1 schematically shows a specific example embodiment of the present invention.

In the figures, the same reference numerals and symbols identify the same components or components having an identical function, unless otherwise indicated.

FIG. 1 schematically shows a device for charging an electrical energy storage device $C_E$. A potential $V_E$ or voltage of energy storage device $C_E$ is measured relative to a ground Gnd. A typical capacitance of an energy storage device $C_E$ is in the range of 2 mF to 20 mF. Potential $V_E$ in the charged state of energy storage device $C_E$ is typically in the range of 22 V to 45 V. The product of the two rated quantities, capacitance and potential $V_E$, squared, provides the amount of energy stored in energy storage device $C_E$. Since the possibility of increasing the capacitance of energy storage device $C_E$ may be limited for reasons of cost and/or the required compactness, potential $V_E$ should attain the above-mentioned quantity for the usable energy amount to be sufficient for ensuring the performance of the basic functions of a device which is to be supplied by energy storage device $C_E$ in the event of a power drop of primary power source E. Airbag control devices typically require a minimum voltage of 10 V, for example, for their operation.

A supply current $I_v$ is provided by a primary power source E. Primary power source E is connected to energy storage device $C_E$ via a main current path. Since a supply potential $V_B$ of primary power source E is typically only in the range between 9 V and 18 V and is therefore lower than the required 22 V to 45 V for energy storage device $C_E$, a voltage transformer device 20 is situated in the main current path. An inductance L and a downstream diode $D_2$ are situated in the forward current direction in the main current path for the voltage transformer device. A point of common coupling of inductance L and diode $D_2$ may be connected to ground Gnd via a second switching element $T_2$ and a resistor $R_2$. Second switching element $T_2$ is opened and closed by a transformer control device 2 via a control signal 102. Second switching element $T_2$ may be designed as an FET transistor, control signal 102 being applied to the gate. A varistor V is connected in parallel to primary power source E in the input area to protect the downstream circuit against overvoltages.

In a first charging phase second switching element $T_2$ is closed. Supply current $I_v$ therefore flows into energy storage device $C_E$ through inductance L and diode $D_2$. The first charging phase is terminated when supply potential $V_B$ is equal to potential $V_E$ of energy storage device $C_E$ because then supply current $I_v$ no longer flows. If the voltage drop across the semiconductor components in the main current path, the first charging phase is terminated when potential $V_E$ is only 1 V to 3 V less than supply voltage $V_B$. The second charging phase starts after the first charging phase.

During the second charging phase second switching element $T_2$ is periodically switched into the conducting state. This results in an alternating current flow $I_L$ through inductance L. According to the law of inductance, inductance L generates an induced voltage which is a function of the parameters inductance and current change. A potential which may be higher than supply potential $V_B$ is then reached at the point of common coupling between inductance L and diode $D_2$. In this way, energy storage device $C_E$ is charged to a potential $V_E$, which is greater than supply potential $V_B$. A reverse current flow from energy storage device $C_E$ into primary supply V is prevented by diode $D_2$.

A current-limiting device 21 is connected upstream from voltage transformer device 20. Current-limiting device 21 has a controllable current source 5, which is controlled by a control unit 6 via a control signal 105. Control unit 6 detects the instantaneous value of supply current $I_v$. For this purpose, a sensor resistor $R_1$ may be situated in the main current path, control unit 6 determining a potential $V_2$ immediately upstream from sensor resistor $R_1$ and a potential $V_1$ immediately downstream from sensor resistor $R_1$. The voltage drop across sensor resistor $R_1$ thus ascertained is a measure of instantaneous supply current $I_v$. If supply current $I_v$ exceeds a predefined maximum current $I_M$, control unit 6 ascertains an appropriate control signal which increases the internal resistance of controllable current source 5 in such a way that supply current $I_v$ is less than maximum current $I_M$.

Figure 2:
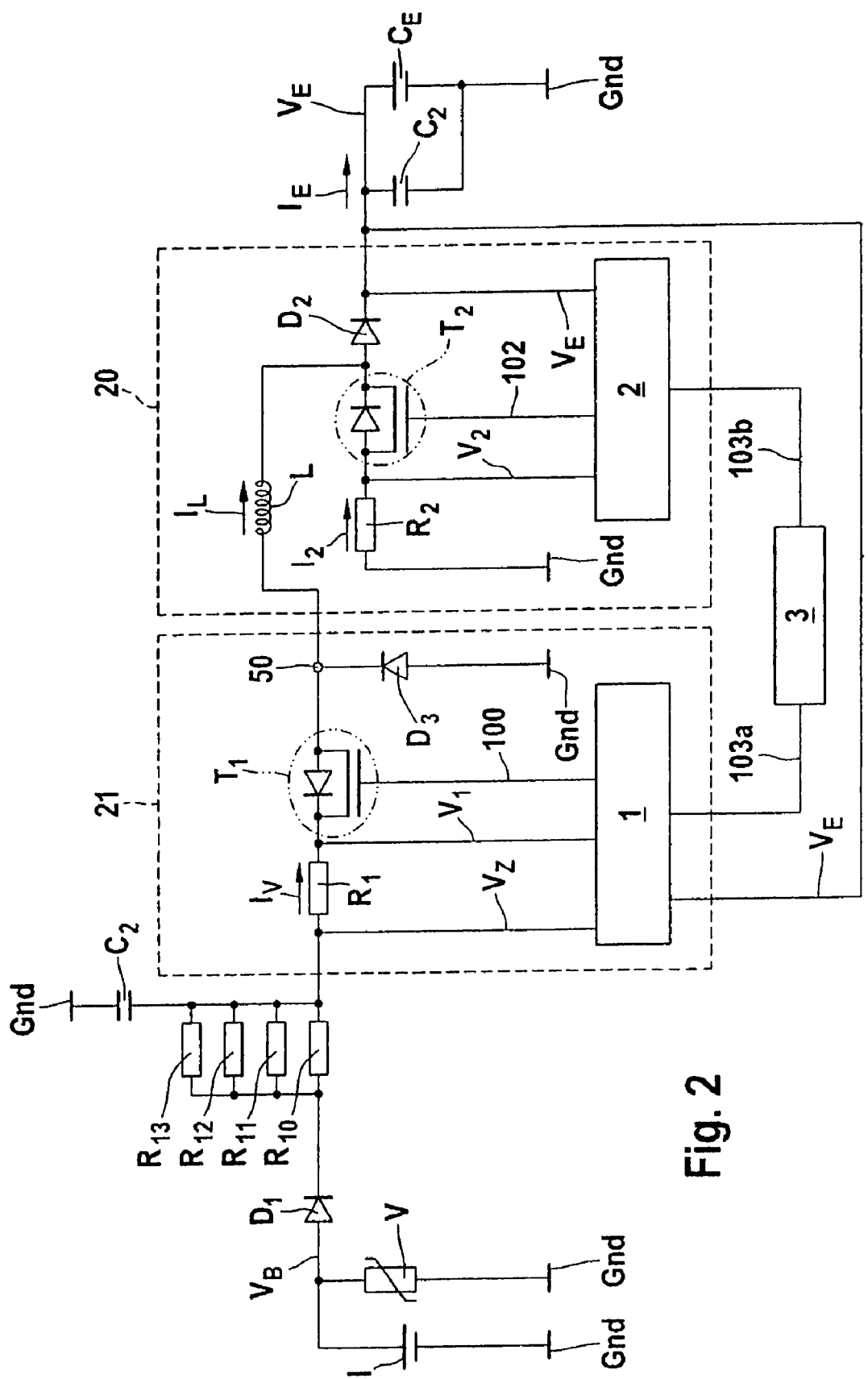
FIG. 2 schematically shows a second specific example embodiment of the present invention.

FIG. 2 schematically shows a second specific embodiment of the present invention. Active current-limiting device 21 has a first switching element $T_1$ in the main current path. The first switching element is connected to control unit 1. Control unit 1 detects the current flow through a sensor resistor $R_1$, which is also situated in the main current path. If the voltage drop across this sensor resistor $R_1$ exceeds a predefined value, i.e., the current flow of supply voltage $I_v$ exceeds a predefined value, control unit 1 opens switching device $T_1$ via a control signal 100, thus interrupting the current flow in the main current path. This ensures that supply current $I_v$ does not exceed a predefined maximum current IM. After a predefined time period, first switching element $T_1$ is closed again and supply current $I_v$ may flow through the main current path again. The timer for the predefined time interval is provided by an oscillator 3, which is connected to control unit 1.

An inductance L for switched voltage transformer device 20 is situated in the main current path. Due to this inductance L, the current flow of supply current $I_v$ does not initially have a square-wave shape when a first switching element $T_1$ is switched on, but has an exponential increase. Therefore supply current $I_v$ is, for a time period, lower than maximum current $I_M$ and may charge energy storage device $C_E$ during this time period.

If first switching element $T_1$ is opened and thus the current flow of supply current $I_v$ is interrupted, the current change induces a drop in the voltage potential at a point of common coupling 50 between first switching element $T_1$ and inductance L due to inductance L. Point of common coupling 50 is connected to a ground Gnd of the device via a diode $D_3$ in the reverse direction. Ground Gnd of the device is also connected to energy storage device $C_E$. Since the induced voltage reduces the potential of a point of common coupling 50 to below ground potential due to inductance L, diode $D_3$ is switched to the conducting state. This results in a closed circuit having diode $D_3$, inductance L, diode $D_2$, and storage device $C_E$. A current $I_L$, which further loads energy storage device $C_E$, flows in this circuit. This current $I_L$ is driven by the induced potential. Energy storage device $C_E$ is thus also charged by the amount of energy which was temporarily stored in inductance L in the form of magnetic energy.

First switching element $T_1$ is permanently switched into the conductive state when voltage potential $V_E$ at the energy storage device has attained a value which differs from supply voltage $V_B$ by 1 V to 3 V at the most. The second charging phase then starts, in which voltage transformer device 20 is activated to increase voltage potential $V_E$ to a potential which is greater than supply potential $V_B$.

Due to the switched-mode operation of switching elements $T_1$, $T_2$ during the charging phases, a low-pass element made up of resistors R10 through R13 and a capacitor $C_2$ is situated upstream from current-limiting device 21 to suppress long-wave interference (100 kHz to 300 kHz) on the leads.

Figure 3:
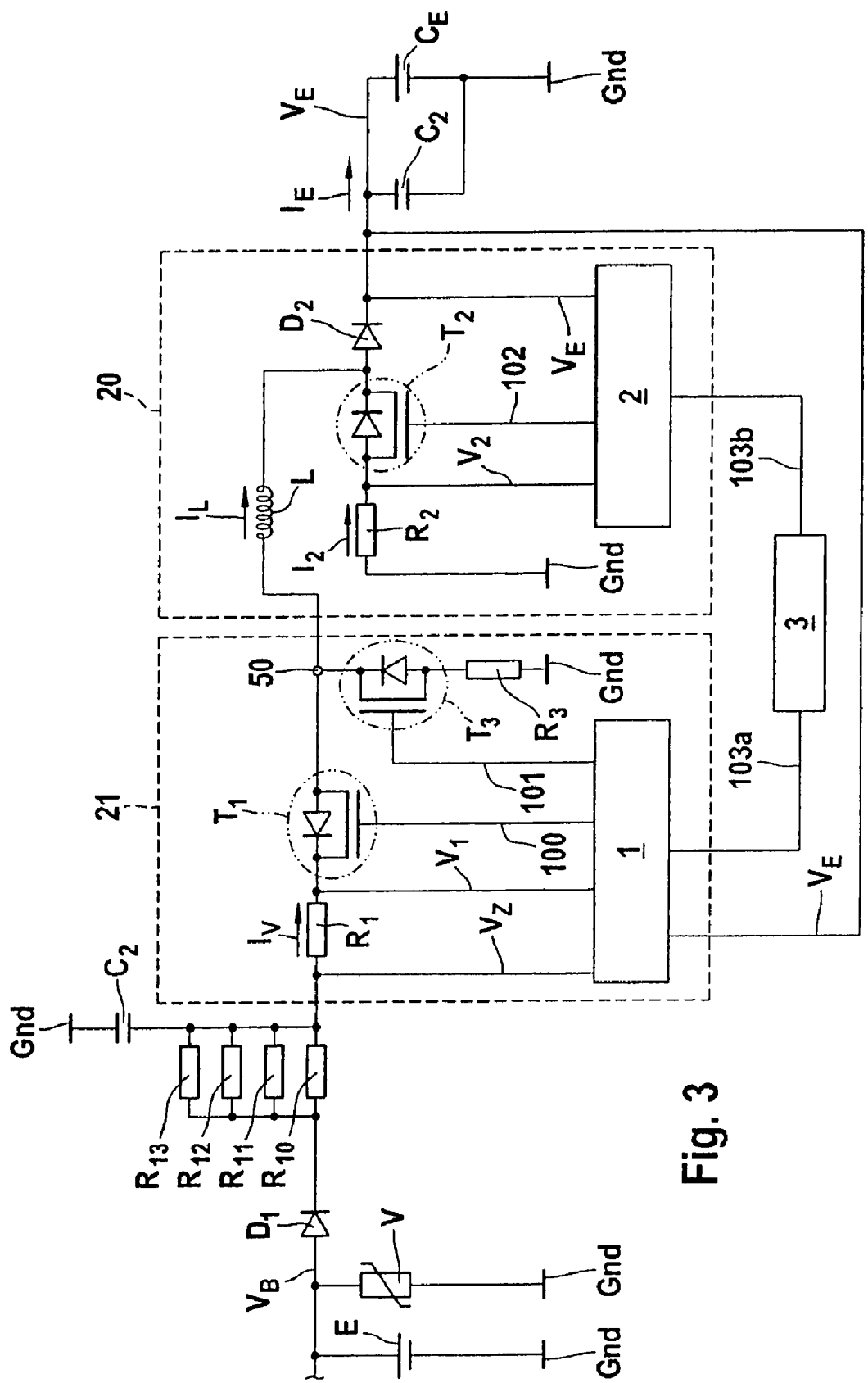
FIG. 3 schematically shows a third specific example embodiment of the present invention.
Figure 6:
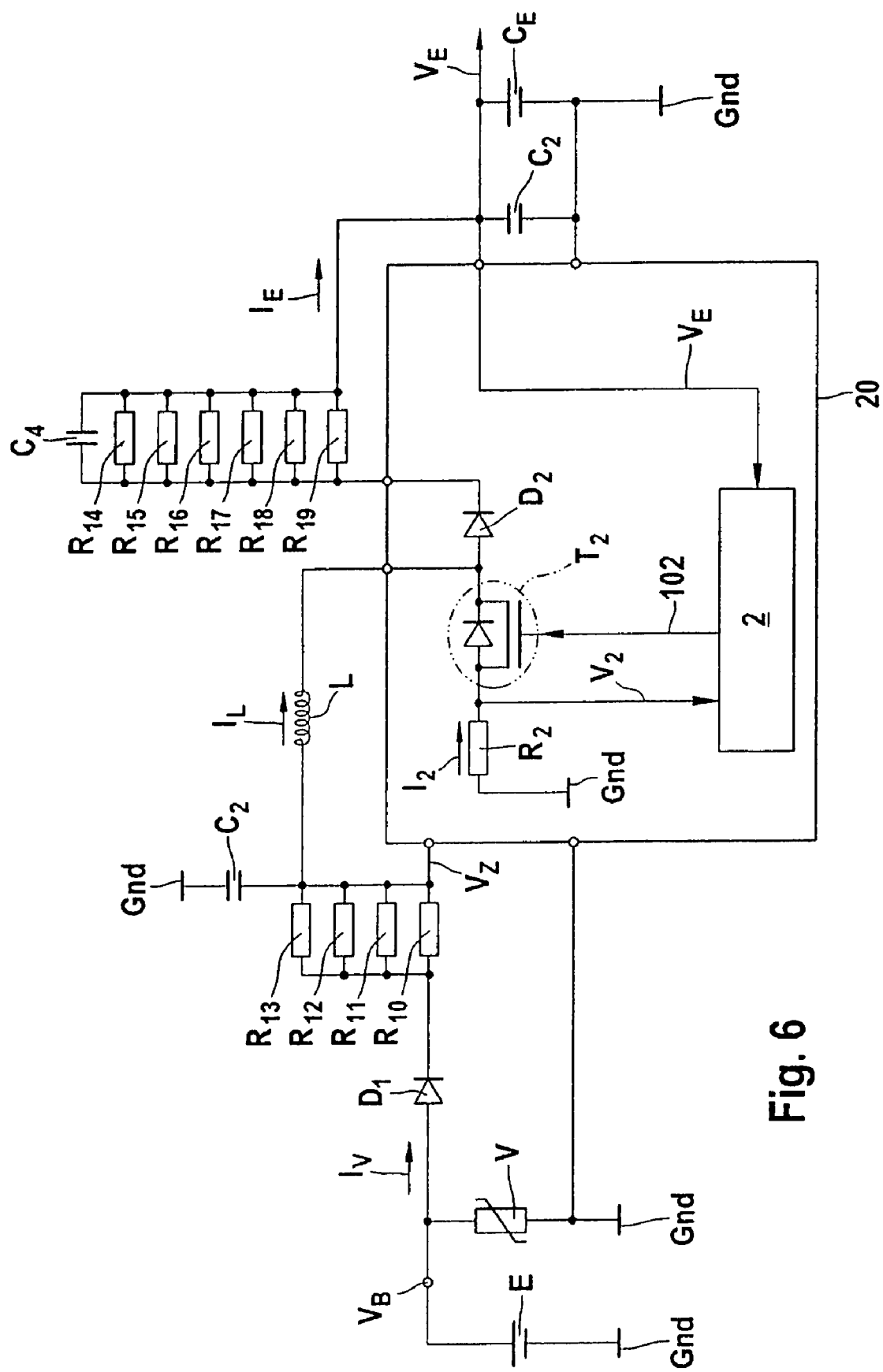
FIG. 6 schematically shows a conventional charging device.

FIG. 3 shows a third example embodiment of the present invention. In the example embodiment of FIG. 2, there is a voltage drop across diode $D_3$, which results in losses when energy storage device $C_E$ is charged by induced current $I_L$. To minimize these losses, diode $D_3$ is replaced by a third switching element $T_3$. This third switching element $T_3$ is connected in phase opposition to first switching element $T_1$. Since almost no voltage drop occurs across third switching element $T_3$ in the conducting state, losses are further minimized and thus the efficiency of the charging device is enhanced.

FIG. 4 shows in a table the switching states of first switching element $T_1$ and third switching element $T_3$ during the first charging phase (precharging phase) and the second charging phase (stepping-up phase), as predefined by the charging device after detection of supply current $I_v$. First switching element $T_1$ remains in the conducting state when detected supply current $I_v$ is lower than maximum current $I_M$. First switching element $T_1$ interrupts the main current path (blocked) when the detected supply current $I_v$ is higher than a predefined maximum current $I_M$. Instantaneous supply current $I_v$ subsequently drops to 0 A. In a next query cycle and/or when charging current $I_E$ in energy storage device $C_E$ drops below a predefined minimum current $I_m$, first switching element-$T_1$ may be switched to the conductive state again. For this purpose, charging current $I_E$, current $I_L$, or the current through diode $D_3$ or through transistor $T_3$ may be detected, which are equivalent in the non-conducting state of first switching element $T_1$. Third switching element $T_3$ is not switched to the conducting state until first switching element $T_1$ is blocked. In addition, phase opposition switching states of $T_1$ (switched) and $T_3$ (push-pull) may be predefined by oscillation signal 103a.

In addition, FIG. 4 shows the switching state of the second switching element which is situated in step-up transformer device 20. During the first charging phase (precharging phase), second switching element $T_2$ and thus step-up transformer device 20 is not active. During the second charging phase (step-up transformer phase) second switching element $T_2$ is cyclically switched, thus activating the operation of step-up transformer device 20. Also in this case, supply current $I_v$ may be limited to a maximum current $I_{M2}$.

FIG. 5 schematically shows the charging state of energy storage device $C_E$, i.e., potential $V_E$ of energy storage device $C_E$ during the first charging phase plotted against time t. During the first charging phase, potential $V_E$ is still lower than supply potential $V_B$, but continuously approaches this value. In the middle diagram, supply current $I_v$ is plotted against time. Supply current $I_v$ is limited by a maximum current $I_M$ according to the above-described method of the second or third specific embodiment. At a point in time 1, first switching element $T_1$ is switched to the conducting state. Subsequently a current $I_L$ flows through inductance L and charges energy storage device $C_E$. At this point in time $t_2$, current $I_L$ through inductance L, which corresponds to supply current $I_v$, attains predefined maximum current $I_M$. At this moment, first switching element $T_1$ is switched to the non-conducting state. Subsequently supply current $I_v$ no longer flows. However, a current $I_L$ continues to flow through inductance L. In this phase, diode $D_3$ is conducting or third switching element $T_3$ is switched to the conducting state. The current flow through inductance $I_L$ decreases exponentially (here linearly approximated). After a predefined time interval, first switching element $T_1$ is switched to the conducting state again. Subsequently a supply current $I_v$ flows again and the current through coil $I_L$ increases again. The points in time at which first switching element $T_1$ is switched to the conducting state may be predefined by an oscillator 3 and its clock signals 103. There is also the possibility of monitoring the current flow through coil $I_L$ and of switching first switching element $T_1$ to the conductive state when current flow $I_L$ through inductance L drops below a predefined minimum current $I_m$.

Maximum current $I_M$ and/or minimum current $I_m$ may be defined according to the specifications of users of the charging device. These predefined values may be stored in a memory of memory device 1. This makes a flexible use of the charging device possible.

Another specific example embodiment, not depicted, uses an FET transistor as first switching element $T_1$. Control signal 100 is applied to the gate and may, at the same time, be connected to ground potential Gnd. The gate is electrically fully insulated from the source-drain channel. If the gate potential is at ground because no control signal 100 is output by control unit 1, this corresponds to the closed state of first switching element $T_1$. The potential induced by inductance L lowers the potential at a point of common coupling 50 to below ground potential Gnd. Since the gate is established at ground potential Gnd, and this is now higher than the potential at point of common coupling 50, first switching element $T_1$ is now kept in the conducting state. This makes a freewheeling circuit via first switching element $T_1$ possible without a freewheeling diode $D_3$. The conductance of transistor $T_1$ drops with the decreasing induced potential until transistor $T_1$ blocks the induced potential after a decay time.

An advantage of the present invention is that voltage transformer device 20 and current-limiting device 21 may be manufactured as one or two components and they do not necessarily need any additional components, except for inductance L and a diode $D_1$, for their operation. This advantageously reduces the space requirements and the assembly costs.

What is claimed is:

1. A device for charging an electrical energy storage device using a charging current, the electrical energy storage device being connected, via a main current path, to an electrical power source, which provides a supply current, the device comprising:
   a switched voltage transformer device that:
      is situated in the main current path;
      is adapted for raising a first electric potential of the electrical energy storage device over an electrical supply potential of the electrical power source;
      has a switching element;
      is adapted for being deactivated during a precharging phase by disabling the switching element; and
      is adapted for being activated during a step-up transforming phase by switching the switching element; and
   an active current-limiting device that:
      is adapted for limiting the supply current to a predefined maximum current;
      is situated in the main current path upstream from the switched voltage transformer device; and
      has a controllable current source that is situated in the main current path and that is controlled by a control unit the supply current and regulating a current flow of the supply current through the controllable current source to the predefined maximum current.

2. A device for charging an electrical energy storage device using a charging current, the electrical energy storage device being connected, via a main current path, to an electrical power source that provides a supply current, the device comprising:
   a switched voltage transformer device situated in the main current path, the switched voltage transformer device adapted to raise a first electric potential of the electrical energy storage device over an electrical supply potential of the electrical power source; and
   an active current-limiting device adapted to limit the supply current to a predefined maximum current, the active current-limiting device being situated in the main current path upstream from the switched voltage transformer device;
   wherein the current-limiting device has a first switching element situated in the main current path, a freewheeling device that connects a tie point of the main current path between the current-limiting device and the voltage transformer device to a ground of the electrical power source, and a control unit that detects the supply current and generates a control signal that switches the first switching element to a non-conducting state when the supply current exceeds a predefined maximum current and switches the first switching element to a conducting state at least one of: (a) when the charging current is less than a predefined minimum current, and (b) after a predefined time period.

3. The device as recited in claim 2, wherein the freewheeling device has a diode that connects the main current path to the ground in a reverse direction.

4. The device as recited in claim 3, wherein the freewheeling device has a third switching device that is connected in phase opposition to the first switching element by the control unit.

5. The device as recited in claim 2, wherein the control unit is adapted to detect at least one of the first electric potential and the electrical supply potential.

6. The device as recited in claim 5, wherein the control unit is adapted to set the predefined maximum current to a first maximum current when the first potential is less than a first threshold value and to a second maximum current when the first potential is greater than the first threshold value.

7. The device as recited in claim 5, wherein the control unit is adapted to set the predefined maximum current as a function of a detected supply potential.

8. The device as recited in claim 6, wherein the first maximum current is lower than the second maxim current.

9. The device as recited in claim 6, wherein the second maximum current is set so that the supply current is not limited by the current-limiting device.

10. The device as recited in claim 6, wherein the threshold value is equal to the supply potential.

11. The device as recited in claim 6, wherein the threshold value is up to 3 V lower than the supply potential.

12. The device as recited in claim 6, wherein the current-limiting device has a memory area in which at least one of the threshold value, the first and second maximum currents, and the minimum current are stored.

13. The device as recited in claim 6, wherein the switched voltage transformer device is de-activated by the control unit when the first potential is less than a second threshold value and is activated when the first potential exceeds the second threshold value.

14. The device as recited in claim 13, wherein the second threshold value is equal to the first threshold value.

15. The device as recited in claim 2, wherein the predefined time period is predefined by an oscillator.

16. A device for charging an electrical energy storage device using a charging current, the electrical energy storage device being connected, via a main current path, to an electrical power source that provides a supply current, the device comprising:
   a switched voltage transformer device situated in the main current path, the switched voltage transformer device adapted to raise a first electric potential of the electrical energy storage device over an electrical supply potential of the electrical power source; and
   an active current-limiting device adapted to limit the supply current to a predefined maximum current, the active current-limiting device being situated in the main current path upstream from the switched voltage transformer device;
   wherein the current-limiting device includes an FET transistor situated in the main current path, a gate and a source of the FET transistor being insulated from each other, and the gate being switchably connected to a ground, and includes a control unit that detects the supply current and generates a control signal that switches the FET transistor to the non-conductive state if the supply current exceeds a predefined maximum current and switches the FET transistor to the conducting state at least one of: i) if the charging current is less than the predefined minimum current, and ii) after a predefined time period.

17. The device as recited in claim 2, wherein the current-limiting device and the voltage transformer device are integrated in a housing.

18. A method for charging an electrical energy storage device using a charging current, the electrical energy storage device being connected, via a main current path, to an electrical power source that provides a supply current, comprising:
   limiting a supply current to a predefined maximum current using an active current-limiting device that is situated in the main current path and that has a first switching element situated in the main current path and a control unit; and
   raising a first electric potential of an electrical energy storage device over an electric supply potential of the electrical power source using a switched voltage transformer device situated in the main current path downstream from the current-limiting device;
   detecting, by the control unit, the supply current; and
   generating, by the control unit, a control signal that switches the first switching element to a non-conducting state when the supply current exceeds a predefined maximum current and switches the first switching element to a conducting state at least one of: (a) when the charging current is less than a predefined minimum current, and (b) after a predefined time period;
   wherein the current-limiting device has a freewheeling device that connects a tie point of the main current path between the current-limiting device and the voltage transformer device to a ground of the electrical power source.

19. The method of claim 18, wherein the raising the first electric potential is performed when the first electric potential exceeds a threshold value.

20. The method as recited in claim 19 further comprising:
   terminating the supply current limitation when the first electric potential exceeds the threshold value.

21. A method for charging an electrical energy storage device using a charging current, the electrical energy storage device being connected, via a main current path, to an electrical power source that provides a supply current, comprising:
   limiting a supply current to a predefined maximum current using an active current-limiting device that is situated in the main current path and that includes an FET transistor situated in the main current path and a control unit; and
   raising a first electric potential of an electrical energy storage device over an electric supply potential of the electrical power source using a switched voltage transformer device situated in the main current path downstream from the current-limiting device;
   detecting, by the control unit, the supply current;
   generating, by the control unit, a control signal that switches the FET transistor to a non-conductive state if the supply current exceeds a predefined maximum current and switches the FET transistor to a conducting state at least one of: i) if the charging current is less than the predefined minimum current, and ii) after a predefined time period;
   wherein a gate and a source of the FET transistor are insulated from each other, and the gate is switchably connected to a ground.

* * * * *